May 2, 1967  R. B. ERNEST  3,317,256
IMPROVED BEARING UNITS WITH LUBRICANT RESERVOIR
Filed May 27, 1964  4 Sheets-Sheet 1
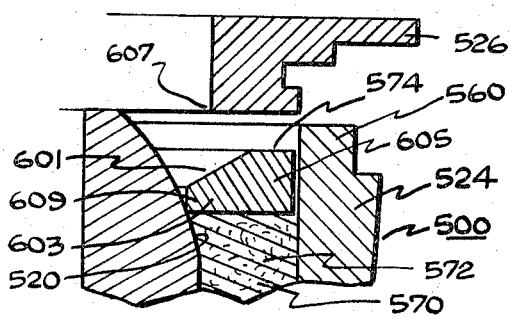
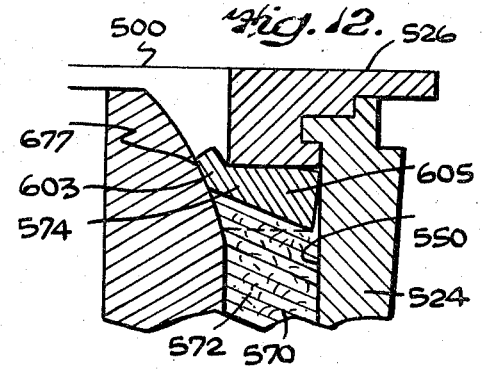
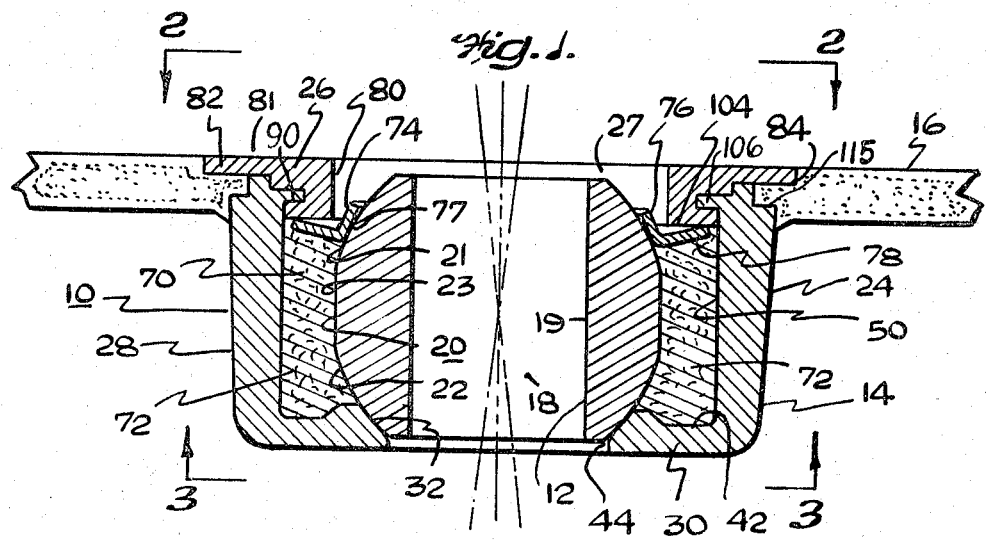
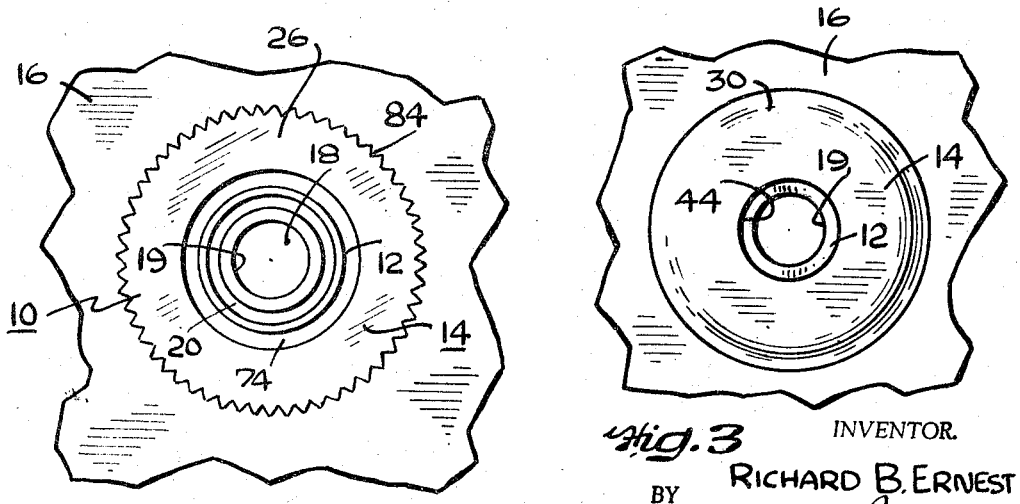
INVENTOR.
RICHARD B. ERNEST
BY Peter J. Patane
HIS ATTORNEY

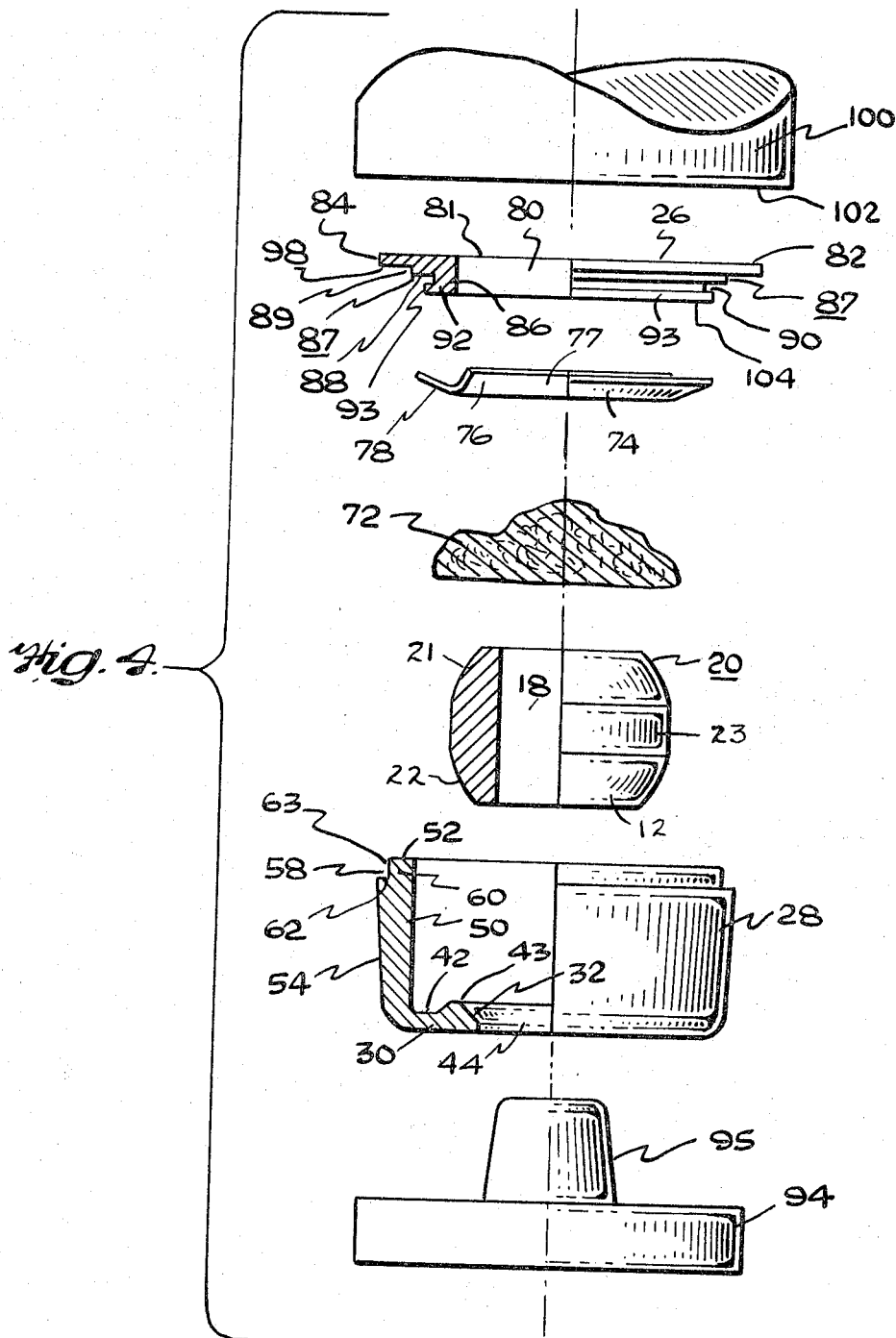

INVENTOR.
RICHARD B. ERNEST
BY Peter J. Patane
HIS ATTORNEY

United States Patent Office 3,317,256
Patented May 2, 1967

3,317,256
IMPROVED BEARING UNITS WITH LUBRICANT RESERVOIR
Richard B. Ernest, Richboro, Pa., assignor to Spyraflo, Inc., Miami, Fla., a corporation of Delaware
Filed May 27, 1964, Ser. No. 370,410
11 Claims. (Cl. 308—132)

This invention relates to bearing units having a lubricant reservoir and it is an object of this invention to provide an improved bearing unit having an improved retainer for housing a lubricant, the retainer being adapted to be secured to relatively thin sheeted plates.

As disclosed in the pending patent application of Klas Arent Swanstrom, Ser. No. 180,903, filed Mar. 19, 1962, many devices are being fabricated today utilizing sheet metal plates through which extend rotating shafts of small diameters and the mentioned Swanstrom application discloses a bearing unit intended for use with sheeted plates and shafts of small diameters.

Also, in the bearing art, the use of bearings formed from various anti-friction materials, such as a plastic material or lubricant impregnated porous metal, is well known.

When a porous metal bearing is used, such as a sintered metal bearing, the operating life of the bearing unit is a direct function of the presence of a film of lubricant, usually oil, between the shaft and the bearing surface, and the existence of this film depends on the availability and volume of the lubricant in the bearing unit.

It is now a common practice to impregnate sintered metal bearings with an oil lubricant. When the impregnated oil lubricant has evaporated, been dissipated due to heat, or been absorbed by dirt, the bearing soon begins to wear unduly and may seize to the shaft. Thus, it has been the practice in some cases, to provide an arrangement for adding lubricant to the bearing unit, if sufficient lubricant is not initially used for the projected life of the apparatus in which the bearing unit is used. It is a further object of this invention to provide a supplemental lubricant reservoir in a bearing unit having a lubricant impregnated porous metal bearing, the supplemental lubricant reservoir supplying several times the quantity of oil originally impregenated in the bearing.

This invention is embodied in a self-aligning bearing unit for a rotatable shaft and the bearing unit comprises a retainer in which is disposed a bearing having a hole to receive the shaft. The bearing is preferably formed of porous material and the retainer is adapted to be driven into a sheeted plate to secure the bearing unit thereto.

The bearing unit includes an annular space, generally defined by the outer surface of the bearing and the inner surfaces of the retainer. In the annular space is placed a lubricant and a wicking material to supply lubricant to the bearing and a resilient washer closes off one end of the space.

The retainer comprises two parts, an elongated cup and a clinching ring. In assembling the bearing unit, the bearing is placed on a seat formed by the cup and the lubricant and wicking material is placed in the annular space defined by the bearing outer surface and the cup inner surfaces. A resilient washer is then placed over the lubricant and wicking material, the washer having a surface defining a seat for the bearing. The clinching ring, which comprises a knurled, annular platform is then placed above the washer.

Since the cup has an end neck of reduced thickness and the clinching ring a cutting shoulder and a communicating undercut, annular portion, when the clinching ring is pressed into the softer cup, the cutting shoulder forces a portion of the cup to be displaced into the undercut of the ring, to lock the clinching ring to the cup, while at the same time the washer is pressed against the bearing, tending to compress part of the washer, and insuring a tension on the bearing, even though commercial tolerances on the assembled parts may vary.

Thus, it is seen that the clinching ring locks the various parts of the bearing unit together and provides a platform which when combined with the reduced neck of the cup defines an annular undercut by which the bearing unit may be clinched to a sheeted panel.

The principles of the invention and the best modes in which I have contemplated applying such principles will further appear from the following description and the accompanying drawings in illustration thereof.

In the drawings:

FIG. 1 is an enlarged vertical sectional view of the improved self-aligning bearing unit of this invention secured to a sheet metal plate;

FIG. 2 is a top view of the bearing unit illustrated in FIG. 1;

FIG. 3 is a bottom view of the bearing unit illustrated in FIG. 1;

FIG. 4 is an enlarged, exploded view, partly in section and partly in elevation, illustrating the bearing unit prior to its assembly, and illustrating the various parts in their sequence of assembly together with the punch and the anvil between which they are assembled;

FIGS. 11 and 12 are partial sectional views showing a further modification, FIG. 11 being similar to FIG. 5 but only a partial view, and FIG. 12 being similar to FIG. 6.

Figure 5:
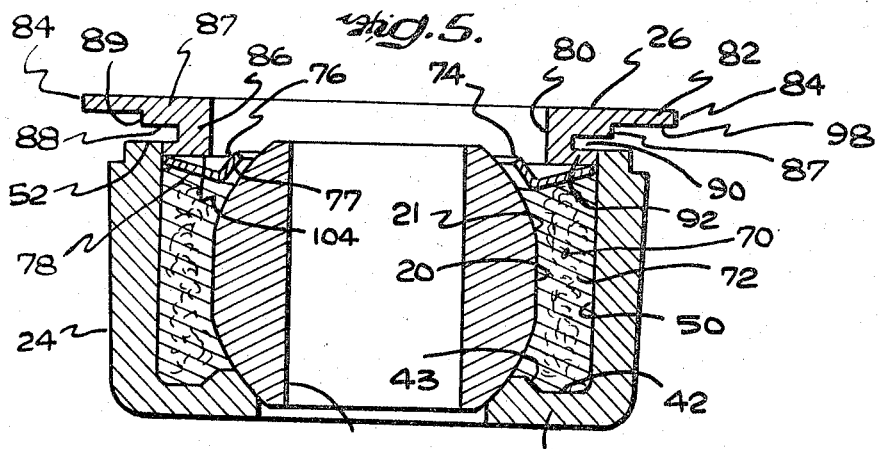
FIG. 5 is a view of the parts shown in FIG. 4 just prior to being pressed together, omitting the anvil and punch shown in FIG. 4.

Referring to the drawings, and in particular to FIG. 1, the improved self-aligning bearing unit 10 comprises an annular bearing 12 housed in an annular retainer 14, the latter being driven into a thin sheeted plate 16. The bearing 12 has a central, circular hole 18 defined by a cylindrical internal bearing surface 19 to receive a shaft, not illustrated.

The bearing 12 has an outer surface 20 which is formed, FIGS. 1 and 4, by upper and lower spherical portions 21 and 22 separated by a cylindrical portion 23, although the outer surface may be entirely a portion of a sphere, if desired. The outer surface 20, as illustrated, is symmetrical (about the medial plane disposed perpendicularly to the longitudinal axis of the bearing 12). Preferably, the bearing 12 is formed from a porous material and preferably impregnated with lubricant, such as an oil impregnated sintered bronze.

Referring to FIG. 1 further, the bearing 12 is secured to the retainer 14, the retainer 14 comprising an elongated cup or elongated annulus 24 and an annular ring 26 clinched thereto, at its upper end, FIG. 1, the bearing 12 being received within the central cavity 27 defined by the cup and the clinching ring. The cup 24 comprises a tapered pilot 28 and an integral rib 30 projecting radially inwardly. The rib 30 includes a thickened, radially inner boss 43, defining an annular seat 32, the latter having a conical shape, and the lower spherical part of the outer surface 20 is seated thereon, making tangential line contact therewith.

As illustrated, the inner surface of the rib 30 is stepped and formed by a circular depression 42 and the raised boss 43. Further, a circular hole 44 extends through the center of the rib 30, the hole 44 having a diameter slightly larger than the diameter of the hole 18 through the bearing.

As illustrated in FIG. 4, the pilot 28 has, prior to assembly with the ring 26, a substantially cylindrical inner surface 50 from the juncture with the rib 30 (at its lower end) to an upper end surface 52 and an outer tapered surface 54 which is preferably of truncated cone shape, thus defining a pilot 28 having an outer surface diameter which is smallest at its lower end. The upper, radially inner, end of the cup 24 is reduced in thickness by an open ended annular space or groove 58 to form a collar or neck 60, the groove 58 being defined by a horizontal circular shoulder 62 and a vertical cylindrical surface 63. Thus, the pilot 28 has an annular wall thickness which is largest just below the horizontal surface 62, is of substantially constant thickness above this surface to form the neck 60, and gradually decreases in thickness below the surface 62 blending in which suitable chamfers, as illustrated, into the rib 30.

The inner surfaces of rib 30, i.e., the depressed surface 42 and the boss 43, together with the major portion of cylindrical surface 50, and the major portion of the outer surface 20 of the bearing 12, generally define an annular space or reservoir 70, into which is placed a wicking material 72 and a lubricant, FIGS. 1 and 5.

Above the wicking material is placed an annular, resilient washer 74 bent generally in the form of a V shape in cross section, FIGS. 1, 4 and 5, and preferably circular, the radially inner leg 76 of the V shape defining a second, conical bearing seat 77, spaced from the first seat 32, and contacting the upper spherical portion 21 of the outer surface 20, the outer leg 78 of the washer 74 closing the upper end of the annular reservoir 70. The washer 74 is preformed to a V shape before the assembly of the bearing unit 10 hereafter described.

The clinching ring 26 is annular, and preferably circular in shape, having a central hole 80 (of a diameter larger than the diameter at the apex of the V shape of the washer 74) through which the shaft for the bearing may extend, the shaft not being illustrated. The diameter of hole 80 is as stated to insure that no interference will take place, on assembly, between the surface 104 and the leg 76, whereby the leg 78 is permitted to flex to the extent desired.

The ring 26 further comprises a radially extending head or platform 82 with an upper flat end surface 81, an outer surface 84, the surface 84 being preferably knurled vertically and axially, and an integral coaxial extension 86 projecting radially downward, FIG. 4. The extension 86 includes a downwardly stepped platform 87 comprising a preferably circular and horizontal surface 88 whose radially outer limit is defined by an annular surface 89 radially inward of the knurled surface 84, and preferably vertical and cylindrical, so that the platform 82 projects radially out beyond the extension, the surface 89 and a part of the surface 88 being pressed into the neck 60, as hereafter described. A portion of the horizontal surface 88 defines in part an undercut annular groove 90, the latter being further defined by a flange or shank 92 having an outer, preferably cylindrical, annular surface 93 radially inward of the vertical surface 89, i.e., the diameter of the surface 93 is less than that of the surface 89.

To assemble the various parts of the bearing unit 10, referring to FIG. 4, the cup 24 is seated upon an anvil 94, the latter preferably having a flat, horizontal surface to receive the lower surface of the rib 30, which is also preferably flat and horizontal and the anvil including an upstanding tapered pilot 95 which then projects through the hole 44 in the rib 30. The bearing 12 is then placed on the lower seat 32 with the pilot 95 extending into the hole 18 of the bearing 12. The relationship between the outer truncated cone shaped surface of the pilot 95 and the hole 18 in the bearing 12 is such that the lower surface portion of the pilot 95 makes a close, sliding fit with the surface defining the hole 18, whereby the bearing 12 is held by the pilot 95 with the bearing axis perpendicular to the flat, lower horizontal surface of the rib 30 and coaxial with the cup 24.

In the annular space or reservoir 70 thus defined by the inner cylindrical surface 50 of the cup, the stepped surface 20 of the rib 30, and the portion of the outer surface 20 above the seat 32, FIG. 5, is then placed the wicking material 72 being preferably a cellulose fiber base material carrying a mineral oil lubricant blended into a self-wicking lubricant and having an appearance of an aggregation of crumbs, the material being readily packed into the reservoir 70, and its major portion, by weight and volume, being oil.

To close off the upper end of the reservoir 70, the resilient washer 74 is then placed over the wicking material 72 and around the bearing 12, the washer 74 resting slightly below the top surface 52 of the cup 24. Preferably, the inner leg 76 of the V-shaped washer 74 is shorter in length and inclined at a smaller angle than the outer leg, relative to a vertical axis through the apex of the V shape, the washer 74 being dished to its V shape from a circular ring of uniform cross-sectional thickness.

Lastly, above the end surface 52 is then placed the clinching ring 26 with the flange 92 making a sliding fit with the inner cylindrical surface 50 of the cup 24, FIG. 5.

With the various parts so aligned, a punch 100 is forcefully pressed against the upper surface 81 of the ring 26, the punch 100 having a flat horizontal face 102 movable perpendicularly to the vertical axes of all the parts, to squeeze or press the various parts between the anvil 94 and the punch 100.

The downward movement of the punch 100 causes the flange 92 to slide along the inside cylindrical surface 50 and the outer portion of the flange end surface 104, which is preferably flat and horizontal, to bear upon the outer extremity of the leg 78. The outer extremity of the leg 78 is sufficiently smaller in outer diameter than the surface 50 to permit the washer 74 to move down without interference therewith, but the downward movement of the washer 74 is resisted by the increasing diameter of the upper spherical portion 21 and the wicking material, whereby the leg 78 flexes downwardly and the leg 76 is biased downwardly against the spherical surface 23. That is, during the downward movement of the washer, the leg 78 bends from its initial position and assumes a more nearly horizontal, though not entirely horizontal position, as generally illustrated, and, since radially inward movement of the inner leg 78 is prevented by the spherical surface portion 21, the force on the leg 78 from the ring 26 is transferred to the spherical surface portion 21 by the leg 76 and the upper seat 77 is thus held tightly against the spherical surface portion 21, the seat 77 biasing the bearing 12 against the seat 32.

When the ring 26 is forced down by the punch 100, the radially outer part of the horizontal surface 88, i.e., the cutting edge portion thereof, presses against the radially inner upper end surface 52 of the cup 24 and displaces some of the softer cup material of the neck 60, downward and radially inward, to form a leg 106 which is tight in the undercut groove 90, the ring 26 becoming secured or locked to the cup 24 and coming to rest with a part of the platform undersurface 98 abutting the end surface 52 of the cup.

Figure 6:
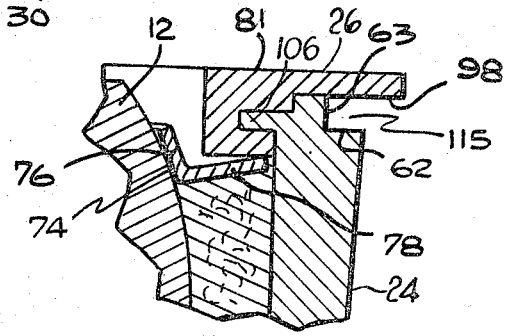
FIG. 6 is a further enlarged, partial view of the upper right hand portion of the bearing unit illustrated in FIG. 1 but omitting the sheet metal plate.
Figure 7:
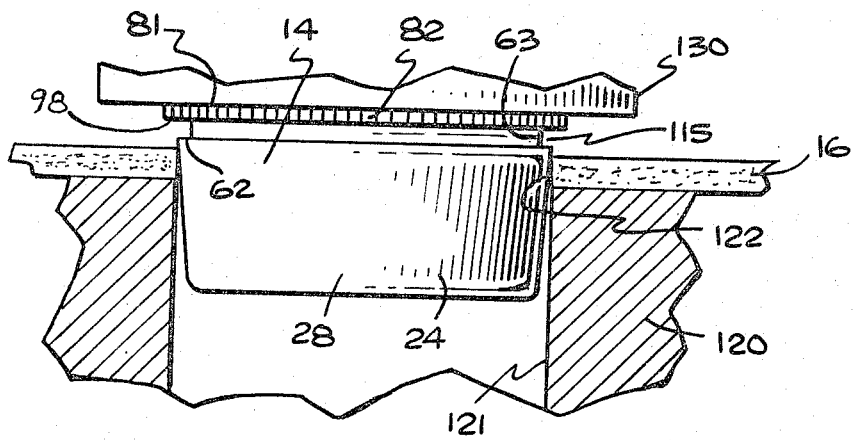
FIG. 7 is an enlarged view, partly in section and in elevation, illustrating the bearing unit centered in the hole in the sheet metal, an anvil supporting the sheet metal plate, and a punch for driving the retainer into the sheet metal plate.

Thus, at the end of the pressing operation, the cup 24 is clinched or secured to the ring 26, and the undersurface 98 of the platform together with the horizontal and vertical surfaces, 62 and 63, respectively, of the cup form an undercut groove 115, FIGS. 6 and 7, relative to the platform 82.

Preferably, the cup 24 is made of a die cast zinc and to facilitate removal from the mold in manufacture the inner surface 50 is tapered (diverging upwardly in FIG. 4) about ½° to 1°. The ring 26 is made of a harder material than the cup 24, such as carbon steel, but other materials for the cup and ring giving the proper hardness ratios may be used. Also preferably the resilient washer 74 is made of spring steel.

It should be noted that the volume of lubricant and wicking material to the volume of the annular reservoir 70 should be such that the reservoir is substantially full but the lubricant is not under pressure when the platform undersurface 98 contacts the upper end surface 52 of the cup, because if the reservoir is overfilled, the lubricant will be squeezed out prematurely and not available later, leaving a higher ratio of wicking material to lubricant during the life of the bearing unit than may be desired. It is also seen, that the tension on the bearing 12 provided by the resilient washer compensates for tolerance variations, if any, in manufacture, between the various parts.

The assembled bearing unit 10 is illustrated in FIG. 7 prior to being clinched by a punch in a thin sheeted plate 16, preferably a sheet metal plate, supported upon an anvil 120 having a central hole 122 aligned with the hole 122 in the plate 110 for receiving the pilot 28 of the cup 24.

The diameter of the hole 122 is smaller than that of the upper portion of the pilot 28 and an interference fit results which centers the retainer 14 properly relative to the hole 122. When the bearing unit 10 is initially inserted in the hole 122 it comes to rest with the undersurface 98 spaced from the top surface of the plate 16.

When the punch 130, FIG. 7, forcefully presses the platform 82 into the sheet metal 16, a portion of the latter is forced to flow downwardly and radially inwardly, as is well known, but now flows into the undercut groove 115, the platform 82 being driven and embedded into the sheet metal with its upper surface 81 flush with the upper surface of the sheet metal plate 16.

From the foregoing, it is seen that the two seats 32 and 77 permit the bearing to move angularly or rock so as to align its longitudinal axis with that of the shaft and at an angle to the longitudinal axis of the retainer, if necessary or desired, but a sufficient pressure is maintained on the spherical surface 20 to restrain rotation of the bearing 12. Also, if desired, one or both of the seats 32 and 77 may be curved to mate with the spherical abutting portions of the bearing 12, instead of being conical as previously described herein.

Figure 9:
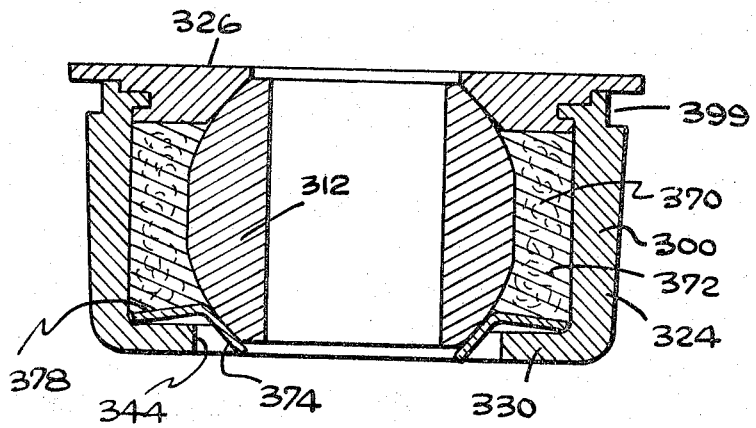
FIGS. 8, 9 and 10 illustrate modifications by sectional views similar to FIG. 1, but omitting the sheeted plate.
Figure 8:
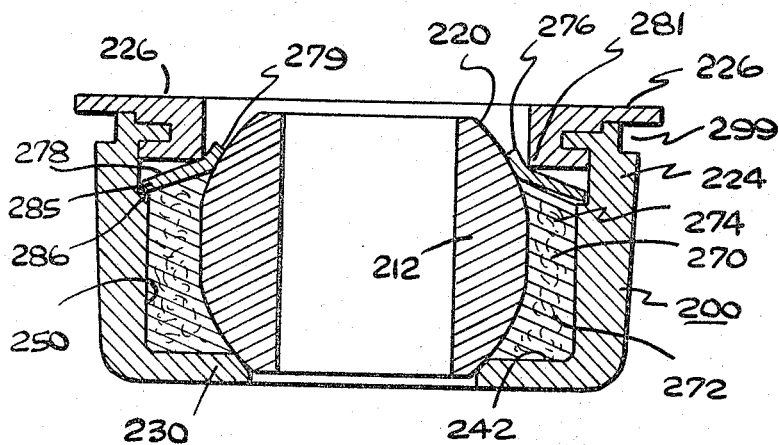
Figure 10:
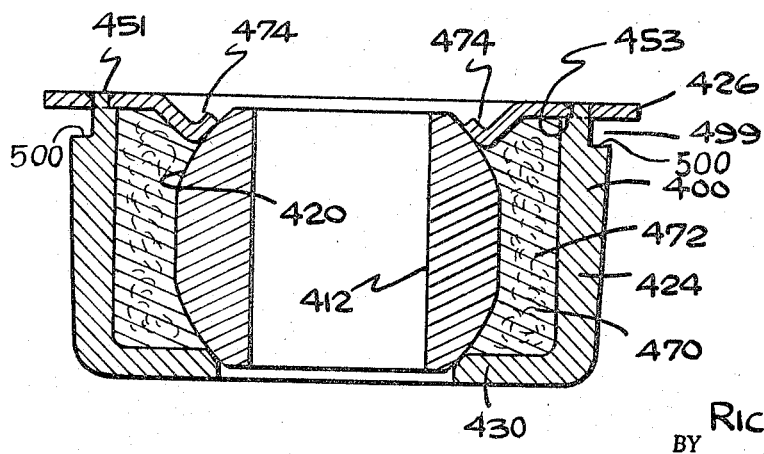

Referring to FIGS. 8, 9 and 10, modifications of the present invention are illustrated. In FIG. 8, a bearing unit 200 is illustrated generally similar to that previously described herein except that the resilient washer 274 is initially flat (not a V shape as in the previous embodiment). The radially inner leg 276 of the washer 274 has slits to provide flexible fingers 279 which provide a seat for the bearing 212, i.e., are inclined and spring biased by the clinching ring 226 against a spherical portion of the outer surface 220 of the bearing 212. During assembly, the ring 226, at annular edge 281, engages the washer 274 and presses the washer 274 down so that the fingers 279 are pressed against the bearing surface 220 and the radially outer edge portion 285 seats on an annular shoulder 286 formed on the wall 250. The washer 274 is thus moved down upon a suitable wicking material and lubricant 272 housed within the annular reservoir 270, generally defined by the horizontal inner surface 242 of the radial rib 230, the outer bearing surface 220, the cylindrical wall 250 and the lower surface of the washer 274, as illustrated in FIG. 8. Thus, the washer 274 is bent to substantially the shape illustrated in FIG. 8.

In the embodiment illustrated in FIG. 9, the bearing unit 300 has a cup 324 having a radial rib 330 which projects radially inwardly less than the corresponding ribs in the previous embodiments. A resilient washer 374, similar to the resilient washer 74 described in connection with FIGS. 1 to 7 but of inverted shape, is seated at the extremity of its outer leg 378 on the rib 330, the central hole 334 formed in the rib 330 being of larger diameter than the apex of the washer 374 so that as the ring 326 is pressed onto the upper end of the cup 324, the bearing 312 is biased down against the washer inner leg 374, and no interference results between the rib 330 and the leg 374. In the annular reservoir 370 is placed the wicking material and lubricant 372 as in the other embodiments.

In the embodiments illustrated in FIGS. 8 and 9, the cups 224 and 324 both have at their upper ends open-ended grooves prior to assembly with the rings 226 and 326, respectively. The parts of the rings 226 and 326 which are secured to the cups 224 and 324 and the overhanging ring platforms are constructed similar to the corresponding parts of the ring 26 illustrated and described in connection with FIGS. 1 to 7, and, when the rings 226 and 326 are clinched to their respective cups, undercut annular grooves 299 and 399 result which are similar to the groove 115 illustrated in FIG. 6, for example.

In the embodiment of FIG. 10, the bearing unit 400 includes a cup 424 having an inwardly projecting rib 430 defining a seat for the bearing 412. Secured to the upper end of the cup 424 is a ring 426 having an array of holes or openings to receive stepped projections or legs 451 formed on the upper end of the cup 424. After the ring 426 is seated on the shoulder surface 453 the upper ends of the projections 451 are peened to secure the ring 426 to the cup 424, the ring 426 having a large enough diameter to overhang the tapered conical outer surface of the cup 424 with a knurled outer surface. Also, the ring 426 has an inwardly extending portion of V shape in cross section which is resilient and comprises an inner leg 474 which presses against a portion of the outer spherical surface 420 of the bearing 412 upon securement of the ring 426 to the cup 424. To increase flexibility of the leg 474 it may have a plurality of generally radial slits to provide an annular array of fingers. The cup 424 also has an annular shoulder 500 forming an open-ended groove at its upper end which together with a portion of the under surface of the ring 426 forms an undercut annular groove 499 after the ring 426 is secured to the cup 424. Thus, the ring 426, the cups 424 and the bearing 412 pointly defined an annular reservoir 470 in which is placed a wicking material and lubricant 472.

FIGS. 11 and 12 illustrate a further modification comprising a bearing unit 500 which utilizes a ring 574 of plastic material, preferably nylon. The bearing unit 500 is constructed similar to the bearing unit 10 illustrated in FIGS. 1 to 7, except that the plastic ring 574 is substituted for the metal resilient ring 74.

The plastic ring 574 is preformed to the general shape illustrated in FIG. 11, FIG. 11 being a partial view but otherwise similar to FIG. 5, the ring 574 having substantially cylindrical inner and outer walls and parallel flat upper and lower surfaces. The inner, upper portion of the ring 574 is chamfered or cut back to form a tapered, conical surface 601. The portion below the surface 601 becomes a thin flexible zone 603, i.e., a zone of substantially smaller cross sectional area relative to the radially outer, thicker zone 605 or remainder of the ring which is more rigid due to its larger mass.

When the ring 526 is pressed into the neck 560, the annular edge portion 607 contacts the conical surface 601 and presses the annular edge portion 609 of the ring 574 against the outer spherical surface 520. Since the spherical surface 520 is increasing in diameter relative to the downward movement of the edge portion 609, downward motion of the plastic ring 574 is resisted by the increasing surface diameter and the wickering material 572 in the annular reservoir 570 which causes the ring to flex or bend and take substantially the V shape illustrated in FIG. 12 when the pressing of the ring 526 onto the neck 560 is completed.

Further, the annular edge 607 is so related to the flexible zone 603 that a minor part of the latter is radially inwardly of the edge 607 when contact is made and this minor part becomes a seat 677 for the bearing and biases the bearing down against its lower seat, the latter not being illustrated in FIGS. 11 and 12.

As illustrated in FIG. 12, it will be noted that the bending of the nylon ring 574 causes the radially outermost cylindrical surface to be compressed against the inner wall 550 of the cup 524, and the major portion of the tapered surface 601 to merge with what, in FIG. 11, was the top horizontal surface of the ring 574 to form, in FIG. 12, a substantially horizontal surface under pressure of the contacting, lowest surface of the ring 526.

Having described the invention, what I claim is:

1. In combination, a sheeted plate, a self-aligning bearing unit for a shaft comprising an annular retainer, said retainer comprising an elongated annular pilot, a rib at one end of said pilot and a ring at the other end, means defined by said elongated annular pilot and ring for locking themselves together and for securing the bearing unit to said sheeted plate by deformation of the latter into locking engagement with said retainer, a spherical-like bearing housed in said retainer, a resilient washer, said pilot and rib defining an annular reservoir, said washer closing one end of said reservoir, said sheeted plate having a hole to receive said pilot, said pilot being tapered to provide an interference fit with said sheeted plate portion defining said hole, and a lubricant and wicking material within said reservoir, said washer locking said bearing to said retainer.

2. A self-aligning bearing unit for a shaft comprising a retainer, a bearing having an outer spherical surface and a central surface defining a hole adapted to receive said shaft, said retainer comprising a cup forming a pilot and a rib, said rib defining a seat for said bearing, a ring secured to said cup, said ring having an opening, said cup having a leg extending tightly into said opening whereby said ring and said cup are secured together, said ring having a portion overhanging said cup, said cup having an annular shoulder forming with a portion of said ring an annular groove radially inwardly of said overhanging portion of said ring, said retainer and bearing defining an annular space for a lubricant and a wicking material.

3. A self-aligning bearing unit for a shaft comprising a retainer, a bearing having an outer spherical surface portion and a central surface defining a hole adapted to receive said shaft, said retainer comprising a cup forming a pilot and a rib, said rib defining a seat for said bearing, a ring being secured to said cup spaced from said rib, said cup having a portion deformed into securement with said ring, said retainer and bearing defining an annular reservoir for a lubricant and a wicking material, said ring including a platform defining with the abutting portion of the cup an undercut outer groove whereby displaced sheeted material is received in said groove when said platform is driven into said sheeted material.

4. The structure recited in claim 2 wherein the platform has a generally circular outer surface whereby it may be driven into a sheeted plate, the end of said pilot spaced from said rib having an annular space defining a neck of reduced wall thickness, said ring including an extension of smaller outside diameter than said platform outer surface and having an inner undercut groove, and a portion of said neck extending into said inner undercut groove to lock the cup and the ring together.

5. A self-aligning bearing unit for a shaft comprising an annular retainer including an elongated annular pilot having a rib at one end of said pilot and a ring at the other end, a spherical-like bearing of porous material housed in said retainer, a resilient washer, said pilot, washer, ring and bearing defining a reservoir, and a lubricant and wicking material within said reservoir, said washer being seated on said rib and locking said bearing within said retainer, said ring having an opening, said pilot having a leg extending tightly into said opening whereby said ring and said pilot are secured together, said ring having a portion overhanging said pilot, said pilot having an annular shoulder forming with a portion of said ring an annular groove radially inwardly of said overhanging portion of said ring.

6. A self-aligning bearing unit comprising an annular retainer formed by a cup and a ring, a spherical-like bearing housed by said retainer, said cup having a pilot with a tapered outer surface, said cup having at one end a rib projecting radially inwardly toward said bearing, said rib defining a seat for said bearing, said ring having a circular platform and an integral extension facing the cup and including a shoulder, said platform overhanging said cup, said extension having an undercut groove communicating with said shoulder, said pilot having an annular outer space at the end abutting said platform to form therewith a second undercut groove relative to the radially outer surface of the platform after the cup is secured to the ring, and a portion of said cup abutting said ring being locked into said first mentioned undercut groove.

7. The structure recited in claim 6 wherein said pilot, ring and bearing define an annular reservoir substantially completely filled with lubricant and wicking material, and said bearing is made of porous material.

8. A self-aligning unit comprising a two-piece retainer including in combination an elongated annulus as a first piece and a ring of different material hardness as a second piece, one of said pieces having an opening into which a portion of the other piece is deformed to lock the two to each other, a spherical-like bearing housed in said retainer, and a lubricant and wicking material housed by said retainer, said elongated annulus comprising a pilot and an open-ended groove, said ring having a platform overhanging said pilot and forming with said groove an annular undercut.

9. The structure recited in claim 8 wherein said elongated annulus includes a radial rib forming a seat for said bearing.

10. The structure recited in claim 9 wherein said ring includes a resilient portion forming another seat for said bearing.

11. The structure recited in claim 9 wherein a resilient washer is biased against said bearing by said ring to form a second seat axially spaced from said first seat.

References Cited by the Examiner

UNITED STATES PATENTS

| 1,291,646 | 1/1919 | Hughes | 29—521 |
| 2,035,519 | 3/1936 | Apple | 308—132 X |
| 2,621,088 | 12/1952 | Cole | 308—72 |
| 2,800,374 | 7/1957 | Ernst | 308—132 |
| 3,013,167 | 12/1961 | Bobula | 308—132 |

FOREIGN PATENTS

| 657,948 | 2/1963 | Canada. |
| 1,042,334 | 6/1953 | France. |
| 815,685 | 7/1959 | Great Britain. |

MARTIN P. SCHWADRON, *Primary Examiner.*

DAVID J. WILLIAMOWSKY, EDGAR W. GEOGHEGAN, N. ABRAMS, R. F. HESS,
*Assistant Examiners.*